Patented Feb. 16, 1926.

1,573,259

UNITED STATES PATENT OFFICE.

MORRIS V. LOWRY, OF SANTA MARIA, CALIFORNIA, ASSIGNOR TO WEST END CHEMICAL COMPANY, OF OAKLAND, CALIFORNIA, A CORPORATION OF CALIFORNIA.

PROCESS FOR PRODUCING BORAX AND SODIUM BICARBONATE FROM LAKE BRINES.

No Drawing.   Application filed April 10, 1923.  Serial No. 631,216.

*To all whom it may concern:*

Be it known that I, MORRIS V. LOWRY, a citizen of the United States, and a resident of Santa Maria, county of Santa Barbara, State of California, have invented a new and useful Process for Producing Borax and Sodium Bicarbonate from Lake Brines, of which the following is a specification.

The present invention relates to an improved method of producing borax and sodium bicarbonate from saline lake brines containing sodium borates, sodium carbonate, sodium chloride, potassium chloride, sodium sulfate and other ingredients. The brine in Searles Lake, San Bernardino County, California, is of suitable character for this process. The following analysis is of brine taken from this lake:

|  | Per cent. |
|---|---|
| Borax ($Na_2B_4O_7 \cdot 10H_2O$) | 3.00 |
| Sodium carbonate ($Na_2CO_3$) | 5.21 |
| Sodium chloride (NaCl) | 15.92 |
| Potassium chloride (KCl) | 4.78 |
| Sodium sulfate ($Na_2SO_4$) | 6.75 |

The preferred method in which my process may be carried out may be described as follows: The brine of approximately the above composition is pumped from the lake to a solar pond and there evaporated to a point where the carbonate content is sufficiently high to hold from 6% to 7% borax in solution at relatively low temperatures. During evaporation, sodium chloride, sodium sulfate and possibly potassium chloride or sulfate will crystallize. The evaporated brine will have a composition of which the following analysis is typical:

|  | Per cent. |
|---|---|
| Borax ($Na_2B_4O_7 \cdot 10H_2O$) | 5.90 |
| Sodium carbonate ($Na_2CO_3$) | 10.95 |
| Sodium chloride (NaCl) | 12.26 |
| Potassium chloride (KCl) | 6.52 |
| Sodium sulfate ($Na_2SO_4$) | 4.24 |

The next step is the introduction of carbonic acid gas into this brine by any suitable and efficient means and in a proper container. The brine temperature should be from 30° to 35° C. The heat generated by the reaction will raise the temperature to about 40° C. which is quite permissible for good results. Sodium bicarbonate will be precipitated as the treatment with carbonic acid gas proceeds and will be held in suspension by the ebullition of the gas itself. Mechanical agitation may be added if necessary. The gas treatment should be discontinued when the amount of normal sodium carbonate present is about 5% of the brine content. This amount is not empirical but gives satisfactory results.

The reaction during carbonation is:

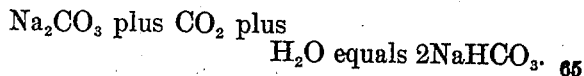

$$Na_2CO_3 \text{ plus } CO_2 \text{ plus } H_2O \text{ equals } 2NaHCO_3.$$

A fairly large proportion of the sodium borates in the brine before carbonation exist as sodium metaborate. The decrease in the normal sodium carbonate concentration, and the increase of sodium bicarbonate to point of precipitation disturb the borate equilibrium so that at the finish of carbonation the borate content is practically all in the form of sodium tetraborate the less soluble sodium borate. The following reaction exemplifies this point.

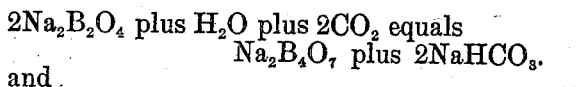

$$2Na_2B_2O_4 \text{ plus } H_2O \text{ plus } 2CO_2 \text{ equals } Na_2B_4O_7 \text{ plus } 2NaHCO_3.$$

and $$2Na_2B_2O_4 \text{ plus } 2NaHCO_3 \text{ equals } Na_2B_4O_7 \text{ plus } Na_2CO_3 \text{ plus } H_2O.$$

The brine will now be transferred to a suitable tank where it may be cooled by artificial or natural agencies to a temperature where the solubilities of sodium tetraborate and sodium bicarbonate are comparatively low. Crystal borax and sodium bicarbonate will be precipitated as a sludge at the bottom of the tank. In addition to these salts, which constitute the main portion, the sludge will contain small amounts of impurities due to the adhering brine. The sludge may now be recovered by decanting the clear supernatant liquor or by filtration of the salts from the liquor.

The sludge or filtered salts will now be mixed with water and with raw or calcined colemanite (in either case reduced to a sufficient fineness to promote a rapid and efficient reaction) in a suitable tank and in proper proportions and heated to a temperature of about 100° C. The borax in the sludge or filtered salt is thereupon dissolved. An exchange takes place between the sodium bicarbonate of the sludge or filtered salt and the colemanite as the following reaction illustrates:

6NaHCO$_3$ plus 2Ca$_2$B$_6$O$_{11}$ equals 3Na$_2$B$_4$O$_7$ plus 4CaCO$_3$ plus 2CO$_2$ plus H$_2$O.

Thus, part of the CO$_2$ in the sodium bicarbonate combines with the CaO in the colemanite to form insoluble calcium carbonate and the B$_2$O$_3$ in the colemanite combines with the Na$_2$O in the sodium bicarbonate to form sodium borate, which at the above temperatures is held in solution. The CO$_2$ which is liberated by this reaction may be recovered if desired, and used for subsequent carbonation of evaporated brine. Thus the total B$_2$O$_3$ content of the sludge and colemanite is rendered soluble, less a small amount due to incomplete reaction.

The rich borax liquor will then be filtered from the waste solids. Borax will be crystallized from this solution and recovered by a suitable means of separation.

By this process the borax, which was mechanically mixed with the sodium bicarbonate in the sludge, is refined since the sodium bicarbonate reacts with the colemanite and the B$_2$O$_3$ content of the refined and recovered borax equals the sum of B$_2$O$_3$ content present in the sludge, and the B$_2$O$_3$ content which was present in the colemanite. Thus the two crude products are mutually refining toward each other.

This process may be varied in practice, without changing the principles involved so that the sludge produced from the cooling of the carbonated liquor may be settled in two or more successive stages, the first stage being the result of a short period of settling with little, if any, drop of temperature, giving a sludge of nearly pure sodium bicarbonate, capable of being refined in the usual manner into a high grade product. The second stage of this variation then, upon dropping the temperature, produces a sludge higher in B$_2$O$_3$ and lower in sodium bicarbonate than is the case when only one sludge separation is made, and in this variation the amount of colemanite required for separating the sodium bicarbonate from the borax is less in proportion.

Various other changes and modifications may be made within the scope of the claim hereto attached without departing from the spirit of the invention.

I claim:

The process of producing crystal borax which consists in concentrating a brine by evaporation, in carbonating the concentrated brine, in cooling the mixture whereby crystal borax and sodium bicarbonate are precipitated as a sludge, in mixing the sludge with colemanite and heating the same to substantially boiling temperature.

MORRIS V. LOWRY.